United States Patent
De Lajudie et al.

(10) Patent No.: US 10,406,749 B2
(45) Date of Patent: Sep. 10, 2019

(54) MACHINE AND METHOD FOR POWDER BASED ADDITIVE MANUFACTURING

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Christophe De Lajudie, Clermont-Ferrand (FR); Ludovic Angele, Clermont-Ferrand (FR)

(73) Assignees: Compagnie Generale Des Etablissements Michelin, Clermont-Ferrand (FR); Michelin Recherche Et Technique, S.A., Granges-Paccot (CH)

( * ) Notice: Subject to any disclaimer, the term of this patent is extended or adjusted under 35 U.S.C. 154(b) by 260 days.

(21) Appl. No.: 15/101,750

(22) PCT Filed: Dec. 5, 2014

(86) PCT No.: PCT/EP2014/076701
§ 371 (c)(1),
(2) Date: Jun. 3, 2016

(87) PCT Pub. No.: WO2015/082677
PCT Pub. Date: Jun. 11, 2015

(65) Prior Publication Data
US 2017/0341365 A1 Nov. 30, 2017

(30) Foreign Application Priority Data
Dec. 5, 2013 (FR) ..................... 13 62183

(51) Int. Cl.
*B29C 64/153* (2017.01)
*B22F 3/105* (2006.01)
(Continued)

(52) U.S. Cl.
CPC .......... *B29C 64/153* (2017.08); *B22F 3/1055* (2013.01); *B29C 64/10* (2017.08);
(Continued)

(58) Field of Classification Search
CPC ... B29C 64/205; B29C 64/214; B29C 64/218; B29C 64/245; B29C 64/255; B29C 64/343
See application file for complete search history.

(56) References Cited

U.S. PATENT DOCUMENTS 5,647,931 A * 7/1997 Retallick ............... B29C 64/153
156/273.3
2005/0263934 A1 12/2005 Chung et al.
(Continued)

FOREIGN PATENT DOCUMENTS

DE 202011003443 U1 * 12/2011 .......... B29C 64/153
EP 1 517 779 2/2004
(Continued)

OTHER PUBLICATIONS

Mingze, Cui, Engineering Training, Aug. 2011 ,(3 pages), https://vpn.hw.sipo/proxy*95455833/image/ss2jpg.dll?did=bfl&pid=7EAC1608AF02.

*Primary Examiner* — Timothy Kennedy
(74) *Attorney, Agent, or Firm* — Dickinson Wright PLLC

(57) ABSTRACT

The disclosure relates in particular to a machine for additive manufacturing by sintering or melting powder using an energy beam acting on a powder layer in a working zone, said machine comprising a device for layering said powder. The device is configured to distribute the powder that are able to travel over the working zone in order to distribute the powder in a layer having a final thickness suitable for additive manufacturing; transfer the powder to a distribution (Continued)

structure by gravity, and control the quantity of powder transferred to the distribution structure.

14 Claims, 6 Drawing Sheets

(51) Int. Cl.
    *B33Y 10/00*     (2015.01)
    *B33Y 30/00*     (2015.01)
    *B29C 64/10*     (2017.01)
    *B29C 64/268*     (2017.01)
    *B29C 67/04*     (2017.01)
    *B29C 67/24*     (2006.01)

(52) U.S. Cl.
    CPC ............ *B29C 64/268* (2017.08); *B29C 67/04* (2013.01); *B29C 67/24* (2013.01); *B33Y 10/00* (2014.12); *B33Y 30/00* (2014.12); *B22F 2003/1056* (2013.01); *Y02P 10/295* (2015.11)

(56) References Cited

U.S. PATENT DOCUMENTS

| | | | |
|---|---|---|---|
| 2013/0108726 A1* | 5/2013 | Uckelmann | B29C 64/153 425/174.4 |
| 2014/0363585 A1* | 12/2014 | Pialot | B29C 64/153 427/551 |
| 2015/0139849 A1 | 5/2015 | Pialot, Jr. et al. | |
| 2018/0229307 A1* | 8/2018 | Pialot | B29C 64/153 |

FOREIGN PATENT DOCUMENTS

| | | |
|---|---|---|
| EP | 1 641 580 | 1/2005 |
| WO | 2004/014636 A1 | 2/2004 |
| WO | 2005/002764 A2 | 1/2005 |
| WO | 2011/007087 A2 | 1/2011 |
| WO | 2013/092757 A1 | 6/2013 |
| WO | 2013/178825 A2 | 12/2013 |

* cited by examiner

MACHINE AND METHOD FOR POWDER BASED ADDITIVE MANUFACTURING

CROSS-REFERENCE TO RELATED APPLICATIONS

This application is a 371 national phase entry of PCT/EP2014/076701, filed 5 Dec. 2014, which claims the benefit of French Patent Application No. 1362183, filed 5 Dec. 2013, the contents of which are incorporated herein by reference for all purposes.

BACKGROUND

The disclosure relates to the machines and processes for powder-based additive manufacturing by sintering or melting grains of said powder using an energy beam such as electromagnetic radiation (for example a laser beam) or a beam of particles (for example an electron beam).

In particular, the disclosure relates to the architecture of the machine and to the means and processes for layering, that is to say for preparing, the bed of powder prior to sintering or to melting of said layer using the energy beam.

Document EP-1641580-B1 in particular discloses a layering device for sintering powders (metallic or ceramic) by laser. This device comprises a feed tray that allows the powder to be stored and to be delivered in a controlled quantity to a grooved roll capable, on the one hand, of transferring said quantity of powder onto and distributing it over the depositing tray during a first passage of the roll over the working zone and, on the other hand, of compacting the powder by a rolling movement of the roll during a second passage. The powder is then subjected to the laser beam. One disadvantage of this configuration is the size and the considerable cost of the feed tray. Another disadvantage is derived from the fact that the length of the working zone is limited by the useful perimeter of the roll.

Document WO-2011/007087-A2 discloses a layering device for melting powders by laser. This device comprises a feed tray that allows the powder to be stored and to be delivered in a controlled quantity to a scraper system capable of feeding the depositing tray and roll(s) capable of distributing said quantity of powder over and compacting it on the depositing tray. The powder is then subjected to the laser beam. One disadvantage of this configuration is the size and the considerable cost of the feed tray and also the necessary complexity of the machine on account of the large number of tools to be controlled (scraper, distribution and/or compacting roll(s), rams for the trays).

Document US-2005/0263934-A1 discloses a layering device for sintering powders by laser. This device comprises feeding and metering means that allow the powder to be delivered in a controlled quantity in the vicinity of the working zone. Feeding takes place by gravity from a stock of powder situated above. A scraper makes it possible to adjust the thickness of a mass of powder, which is then subjected to a preheating operation. A rotary roll then makes it possible to transfer said quantity of preheated powder to and distribute it over the working zone. A quantity of powder may likewise be deposited on the cover of the carriage carrying the roll from one side of the working zone to the other and is thus only employed during the return of the roll. One disadvantage of this configuration is the risk of a part (even a very small part) of the powder being retained on the cover and subsequently falling into the working zone during the passage of the carriage above the bed of powder. This risk is not acceptable in the context of industrial use.

Document WO2013/092757 describes a machine and a process for powder-based additive manufacturing in which a layering device has feeding means and metering means that move as one with means for distributing the powder over the working zone.

One problem that is common to the various proposals in the prior art is low overall productivity of the installation, since melting is interrupted during the layering phases and, conversely, layering cannot take place during melting phases.

SUMMARY

The object of the disclosure is thus to overcome at least one of the disadvantages described above.

To this end, the disclosure proposes a machine for additive manufacturing by sintering or melting powder using an energy beam acting on a powder layer in a working zone, said machine comprising a device for layering said powder, said device comprising:
  means for distributing the powder that are able to travel over the working zone in order to distribute the powder in a layer having a final thickness suitable for additive manufacturing,
  feeding means that are able to transfer the powder to the distributing means by gravity,
  metering means that are able to control the quantity of powder transferred to the distributing means,
wherein the feeding means and the metering means are able to move with the distributing means, said machine being characterized in that:
  the machine has two separate working zones,
  the machine has two separate working trays that are able to move independently of one another,
  each of the two working trays is associated with only one of the two working zones,
  the layering device comprises a movable carriage carrying the feeding means, the metering means and the distributing means, said movable carriage being common to both working zones,
  the machine comprises a central waiting zone situated between the two working zones, said central waiting zone being able to accommodate the movable carriage of the layering device, and
  the layering device is configured in a substantially symmetrical manner so as to be able to travel over each working zone in the direction of the central waiting zone during a layering operation.

Preferably, the machine also comprises powder storage means, the storage means being positioned higher up than the working zones.

Preferably, the machine comprises a source and means for controlling the energy beam, said source and means being inherent to each of the two working zones.

Preferably, the layering device is configured so as to carry out the layering in a single passage over a working zone.

Preferably, the storage means comprise at least one hopper, said at least one hopper also being carried by the movable carriage with the feeding means, the metering means and the distributing means.

Preferably, the metering means comprise at least one rotary metering roll provided with at least one cavity, preferably a groove capable of defining a metered quantity of powder during metering.

Preferably, the distributing means comprise at least one distributing roll.

Preferably, the height of said at least one distributing roll is adjustable depending on the angular position of said roll.

Preferably, the metering means comprise two rotary metering rolls positioned on either side of the distributing means, each of the two metering rolls being assigned to one of the two working zones.

Preferably, the distributing means use a single distributing roll that is common to both working zones.

According to another preferred embodiment, the distributing means comprise two distributing rolls positioned on either side of the metering means and feeding means, each of the two distributing rolls being assigned to one of the two working zones.

Preferably, the metering means use a single rotary metering roll that is common to both working zones.

According to another preferred embodiment, the distributing means comprise two scrapers positioned on either side of the metering means and feeding means, each of the two scrapers being assigned to one of the two working zones.

Preferably, the machine also comprises two compacting rolls, the movement of which over the working zone is as one with the movement of the distributing means, each of the two compacting rolls being assigned to one of the two working zones.

The disclosure also proposes a process for the additive manufacturing of components by sintering or melting powder using an energy beam, comprising steps that consist successively of:

A—depositing a layer of powder in a working zone using a layering device,

B—melting said layer of powder in the working zone using an energy beam in a pattern corresponding to a section of the components, C—repeating steps A and B until the components are finished, said process being characterized in that:
  a machine having two separate working zones is used, each working zone resting on a separate working tray,
  a single layering device is used for both working zones, and
  the layering device travels over each working zone in the direction of a central waiting zone situated between the two working zones during a layering operation.

BRIEF DESCRIPTION OF THE DRAWINGS

Preferably, a source and means for controlling the energy beam are used, said source and means being inherent to each of the two working zones.

The disclosure will be better understood from the remainder of the description, which is based on the following figures.

DETAILED DESCRIPTION

In the various figures, identical or similar elements bear the same references or references that are clearly related to one another. Therefore, the description of the structure and the function of these identical or similar elements is not repeated systematically.

Figure 1:
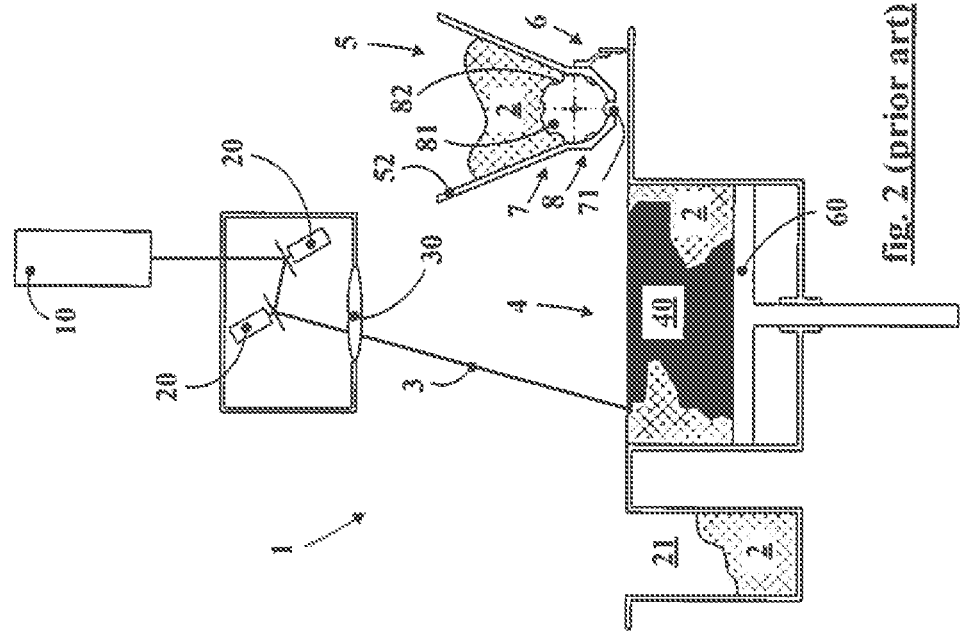
FIG. 1 is a schematic cross-sectional view of a first machine according to the prior art.

FIG. 1 schematically shows a first machine according to the prior art for the additive manufacturing of a component 40. An energy source, in this case a laser source 10, emits a laser beam 3, the orientation of which is controlled by mirrors subjected to galvanometers 20. An optical lens 30 focuses the beam 3 on the working zone 4 in order to heat the upper layer of the powder 2 in a precise pattern and thus to selectively melt the powder, the pattern corresponding to a section of the component to be produced. Following the treatment of a layer of powder by the beam, the working tray 60 is lowered by a unit thickness and is covered with a fresh layer of powder, and so on in order to form the component 40 layer by layer. Depending on the types of energy beam and the powders that are used, the thickness of a layer of powder may vary from a few micrometres (for example 10 μm) to several hundred micrometres (for example 500 μm=0.5 mm). When the component 40 is finished, that is to say when the hundreds or the thousands of layers necessary for its construction have been successively solidified, the component is removed from the working zone.

The parts of the machine for the application of a fresh layer of powder to the working zone are generally referred to as a whole as the "layering device". The layering device of the prior art comprises storage means 5 and means 6 for distributing the powder 2 over the working zone 4. As described above, the storage means of the prior art generally use a vertically movable tray 51, which is similar to the working tray 60. The distributing means 6 (not shown in detail in FIG. 1) have the function of distributing a thin layer of powder over the entire working zone. Feeding means 7 (not shown in detail in FIG. 1) have the function of transferring the powder from the storage means to the distributing means 6. The distributing means and the feeding means of the prior art commonly use scrapers and/or rolls carried by one or more carriages, said carriages being able to move between the storage means 5 and the working zone 4. Metering means 8, in this case means for precisely controlling the raising of the movable tray 51, make it possible to control the quantity of powder employed each time the layering device is used. Once the distributing means have traveled over the entire working zone (towards the left in FIG. 1), the surplus powder is pushed into a recovery container 21.

Figure 2:
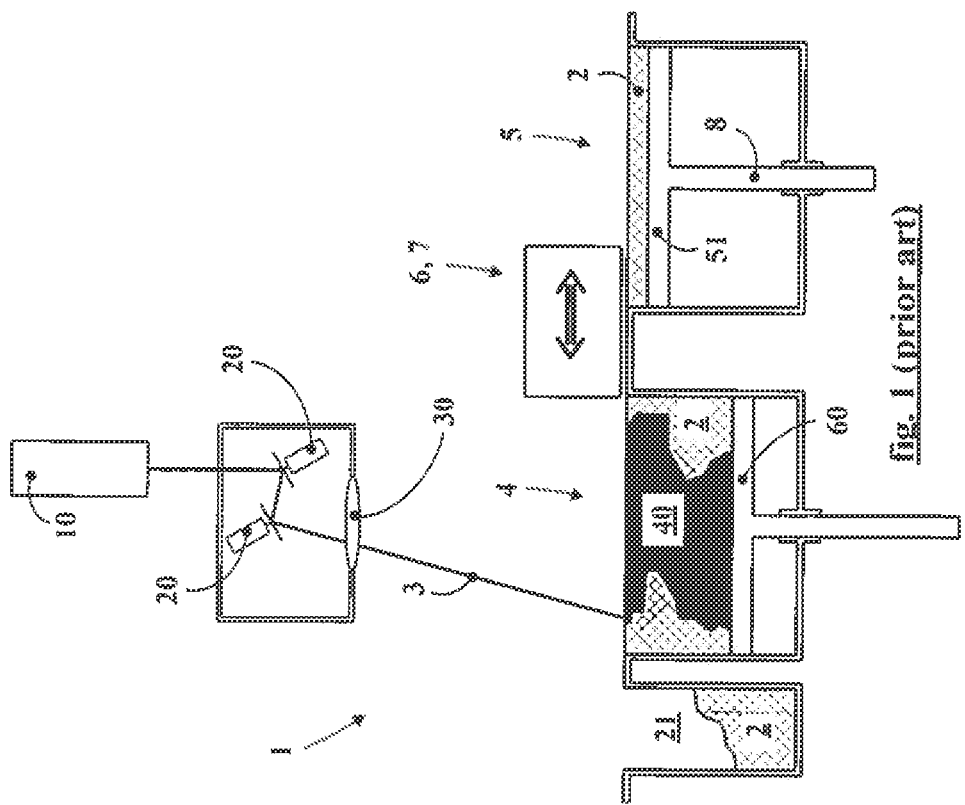
FIG. 2 is a schematic cross-sectional view of a second machine according to the prior art.

FIG. 2 shows a machine according to the prior art as described in document WO2013/092757. The storage means 5 are in the form of a hopper 52 positioned above the plane of the working zone 4. The distributing means 6 use a scraper. The scraper is integral with the hopper. The feeding means 7 use a lower opening 71 in the hopper in order to transfer the powder towards the distributing means 6 by gravity. Metering means, in the form of a rotary metering roll 81, make it possible to control the quantity of powder transferred. The layering device travels over the working zone in order to distribute a layer of powder 2. At the end of travel, the surplus powder is pushed into a recovery container 21.

Figure 3:
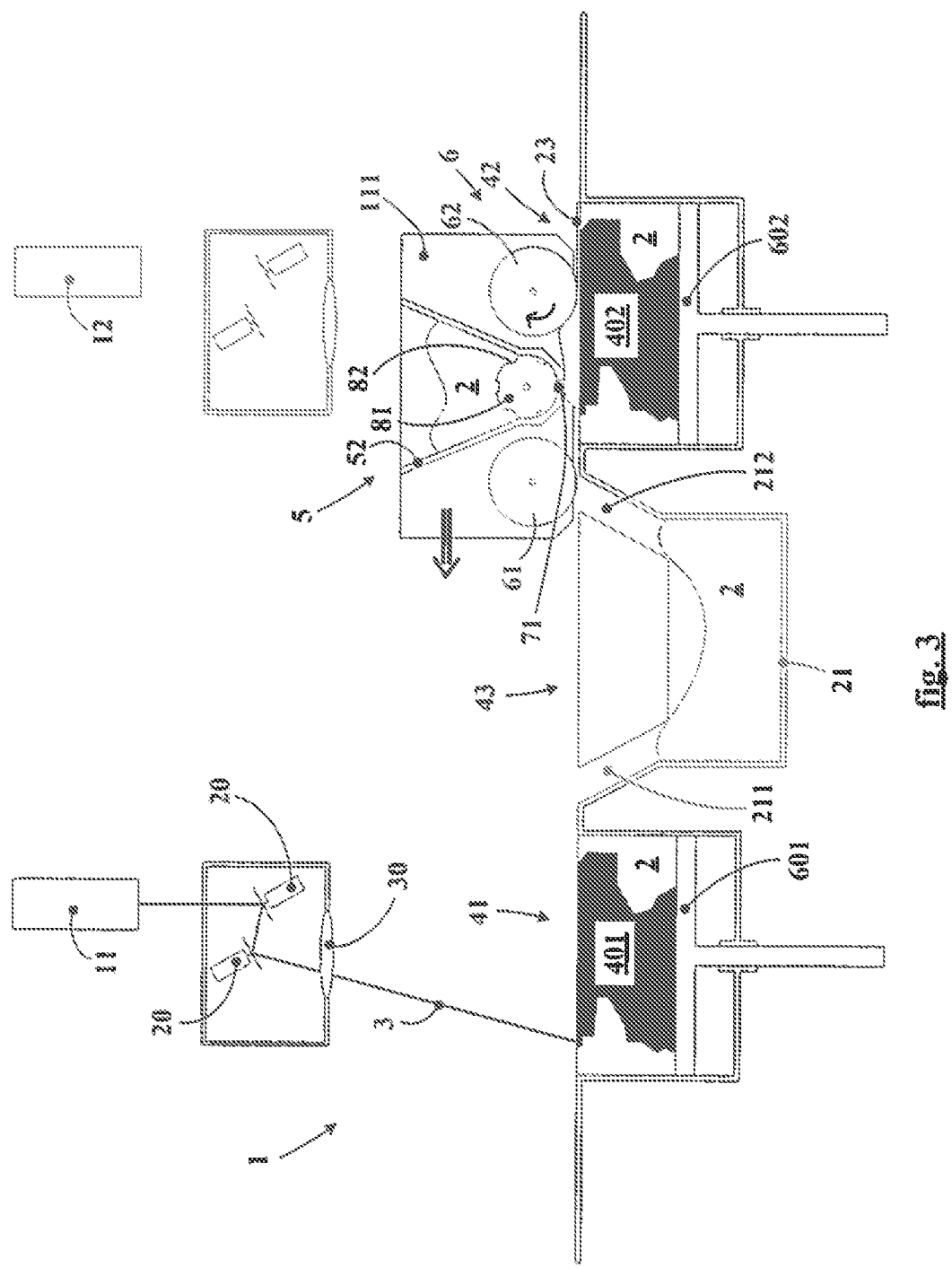
FIG. 3 is a schematic cross-sectional view of a machine according to a first embodiment of the disclosure.

FIG. 3 shows a first embodiment of the machine 1 according to the disclosure. An essential feature of the machine according to the disclosure is that it has two separate working zones 41 and 42 and that the layering device is common to both of these working zones. The machine thus has two separate working trays 601 and 602 that are able to move independently of one another, each of the two working zones resting on its own working tray. The two working zones are coplanar. The source and the control of the energy beam 3 are shown in a manner that is identical to the prior art. This is only one example. As described in the preamble to the application, the disclosure is applicable in reality to all types of powder-based additive manufacturing by sintering or by completely melting the grains of said powder using an energy beam such as electromagnetic radiation (for example a laser beam) or a beam of particles (for example an electron beam). Therefore, the rest of the present description will concentrate mainly on the process and the layering device and on the cooperation of the layering device with the two working zones. The machine comprises a central waiting zone 43 situated between the two working zones 41 and 42. When the movable carriage 111 of the layering device is parked in the waiting zone (see FIG. 5), the two working zones can be used for melting. The fact that the waiting zone is situated between the two working zones allows the layering device to come into action in either one of the two working zones without interrupting or disturbing the work in the other zone.

A preferred embodiment in which the machine also comprises, for each working zone, an inherent source (11, 12) and inherent means for controlling the energy beam is shown here. However, it is also possible to use a single source which is moved or the beam of which is diverted alternately over one zone or the other, as described for example in document EP 1517779-B1. The degree of use of the common source may then tend towards 100%. The advantage of a configuration using a single source is mainly that of further lowering the cost of the machine according to the disclosure. In the preferred case shown here, where the machine comprises a source inherent to each working zone, it is possible for the machine to simultaneously carry out the melting of the powder in both the left-hand working zone 41 and right-hand working zone 42 when the carriage of the layering device is positioned in the central waiting zone 43 (see FIG. 5). It will be understood that the overall productivity of the machine is thus enhanced, even though the degrees of use of each of the two sources remain well below 100%.

Another essential feature of the disclosure is that, during the layering operation, the movable carriage of the layering device travels systematically over the working zone in the direction of the central waiting zone. This means that the layering device is configured to work from the right to the left in the right-hand working zone 42 (as is shown in FIG. 3) and from the left to the right in the left-hand working zone 41. The layering device and its operation are thus substantially symmetrical. Preferably, the recovery container 21 is common to both working zones and is situated under the central waiting zone 43. It will be understood that excess powder for the left-hand working zone 41 is pushed into the shaft 211 and excess powder for the working zone 42 is pushed into the shaft 212. The two shafts converge in the common recovery container 21.

The storage means 5 are in this case in the form of a hopper 52 which moves above the plane of the working zones 41 and 42. The distributing means 6 in this case use distributing rolls 61 and 62. The right-hand roll 62 distributes the powder for the right-hand zone 42 and the left-hand roll 61 distributes the powder for the left-hand zone 41. The feeding means 7 use simply a lower opening 71 in the hopper in order to transfer the powder 2 towards the distributing means 6 by gravity. Metering means, in this case in the form of a rotary metering roll 81 comprising at least one cavity, make it possible to control the quantity of powder transferred. Said at least one cavity, preferably a groove 82, defines a reproducible metered quantity of powder. The groove(s) extend(s) substantially along the entire useful length of the metering roll 81, that is to say substantially over the entire width of the working zones 41 and 42. The dimensions and shape of the section of the grooves 82 can vary along the roll 81 in order to further improve the distribution of the powder over the entire working zone.

FIGS. 3 to 7 schematically show typical successive steps in the manufacturing process made possible by the machine according to the disclosure.

Figure 4:
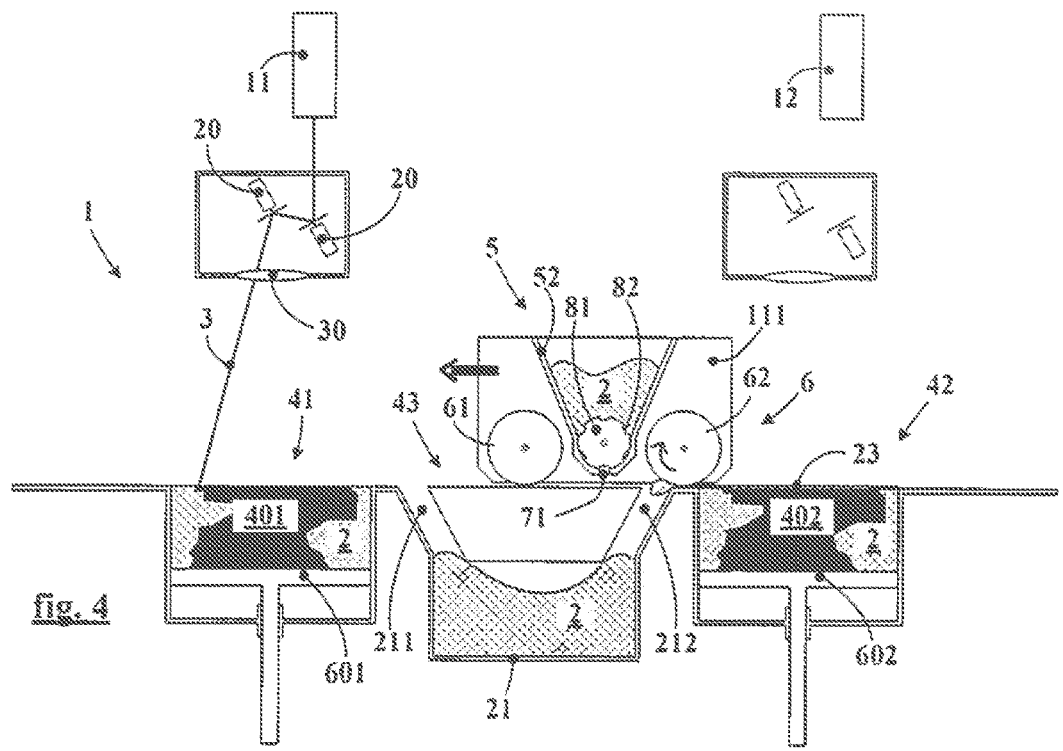
FIGS. 4, 5, 6 and 7 are schematic views of typical steps in the manufacturing process made possible by the machine according to the disclosure.

In FIGS. 3 and 4, it is possible to see that a layer 23 of powder 2 is progressively deposited on the right-hand working zone 42 by the layering device. In parallel with this layering, the melting of a previously deposited layer of powder takes place in the other working zone (left-hand working zone 41) in order to progressively form the left-hand component 401.

More specifically, FIGS. 3 and 4 show that a quantity of powder is deposited on the working zone through the lower opening 71. Said quantity of powder may correspond to one or more metered quantities, that is to say to the contents of one or more grooves 82 in the metering roll 81. The distributing roll 62 ensures the formation of a layer of powder of controlled thickness and pushes the surplus powder into the recovery container 21 by way of the right-hand shaft 212. The distributing roll can be a fixed or preferably counter-rotating roll, that is to say made to rotate in the opposite direction to its movement (as indicated by an arrow in the figures).

Figure 5:
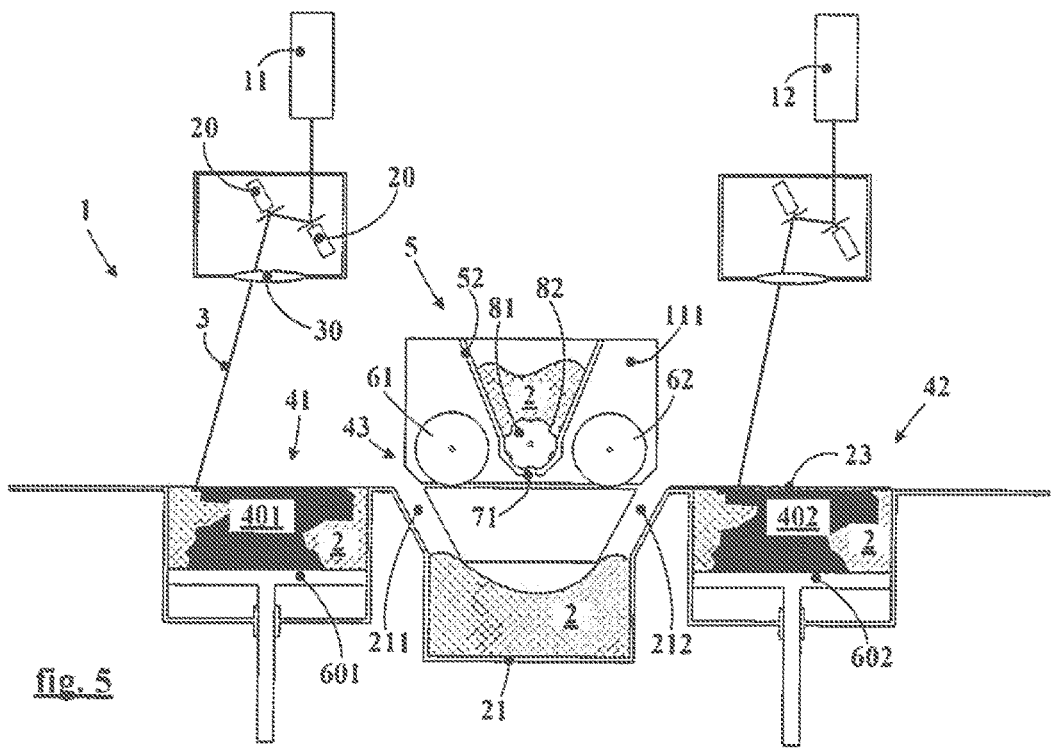

As shown in FIG. 5, when the layering is finished in the right-hand working zone 42, the movable carriage 111 of the layering device can be positioned in the central waiting zone 43 in order to be immediately available for the preparation of a fresh layer of powder in one or the other of the working zones. It is thus possible for the melting of the powder to take place simultaneously in both working zones, as shown here.

Figure 6:
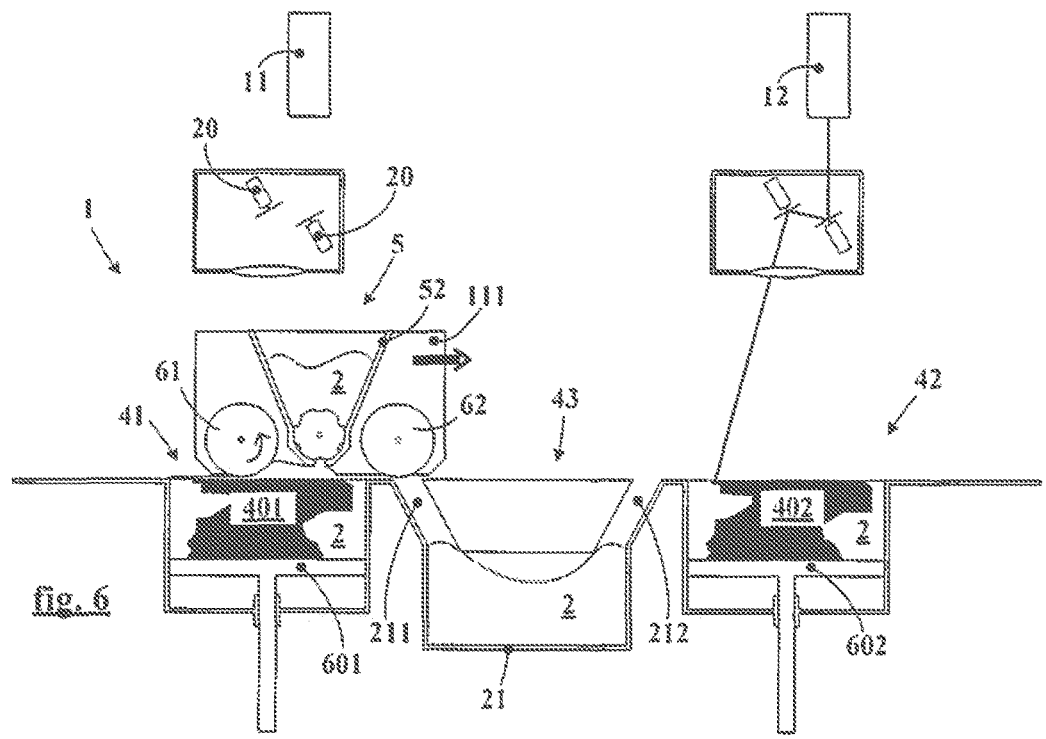
Figure 7:
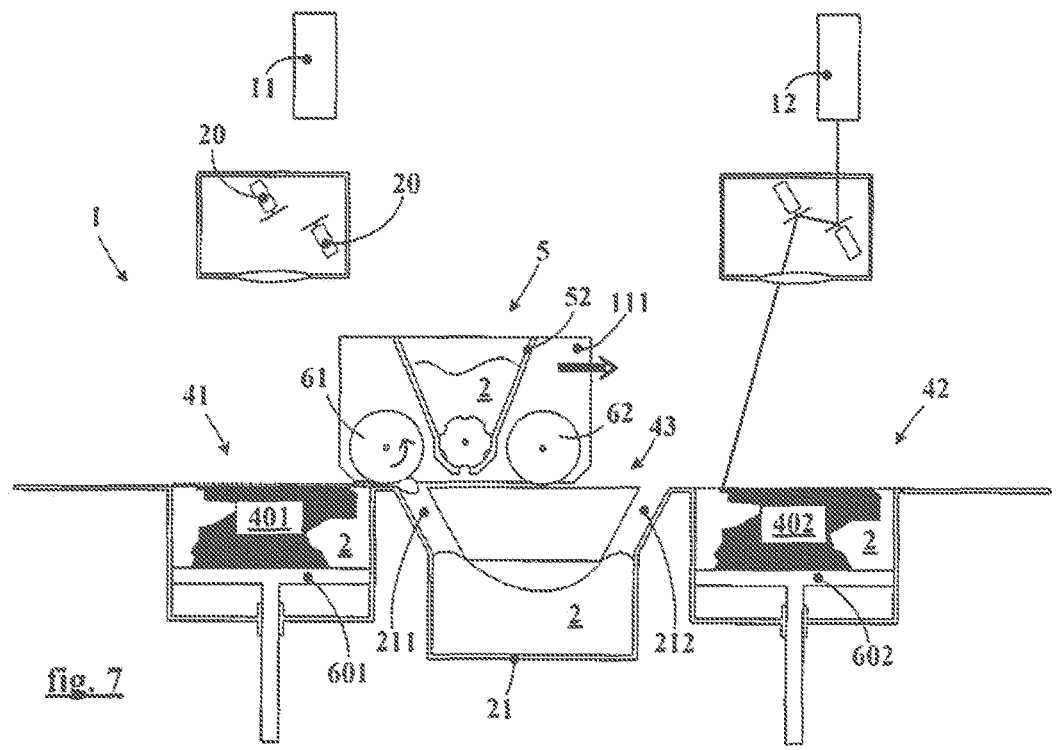

As soon as the melting of one layer is finished in the left-hand working zone 41, the left-hand working tray 401 can be lowered and the layering device can deposit a fresh layer of powder in this working zone, as shown in FIGS. 6 and 7. Thus, the single layering device is used alternately in both working zones. Of course, it will be understood that in practice the layering sequences do not necessarily alternate between the two working zones. This depends on the time that is effectively necessary for the melting for each layer of each of the two components 401 and 402. For example, it is quite possible for the melting time for a layer in one of the working zones to be relatively long while, at the same time, two or more layers can be deposited and melted in the other working zone. It is also possible for the layers deposited and melted in one of the components to be multiplied while the other component is being removed from the machine and/or while the working zone is being prepared for the manufacture of a new component. Thus, the important point is that the machine according to the disclosure makes it possible to work virtually independently in the two working zones, in particular in the case shown here, where it comprises two energy beam sources, one for each working zone.

In this embodiment of the layering device, the storage means, metering means and feeding means are common to both working zones. By contrast, each of the two distributing rolls 61 and 62 is dedicated to a single working zone.

On the basis of this embodiment, a second approach consists, by contrast, in providing for the carriage to also be able to be parked outside the working zone. In this case, layering can take place in both directions of travel in each working zone. The two distributing cylinders are then used alternately in the direction of movement of the carriage in a given working zone. Thus, the carriage would not systematically pass through the central waiting zone and would thus preserve the surplus of powder between the distributing rolls without systematically pushing it into the recovery container. One advantage is then an additional improvement in the productivity of the machine and reduced consumption of powder.

Figure 8:
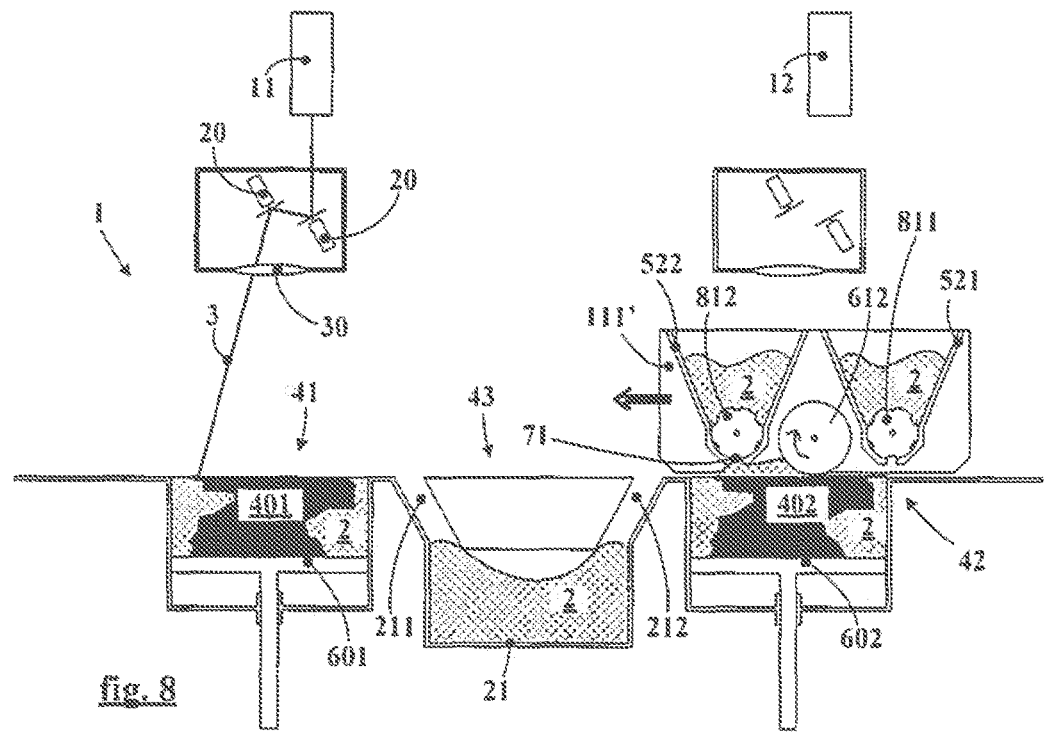
FIGS. 8 and 9 are schematic cross-sectional views of a machine according to a second embodiment of the disclosure.
Figure 9:
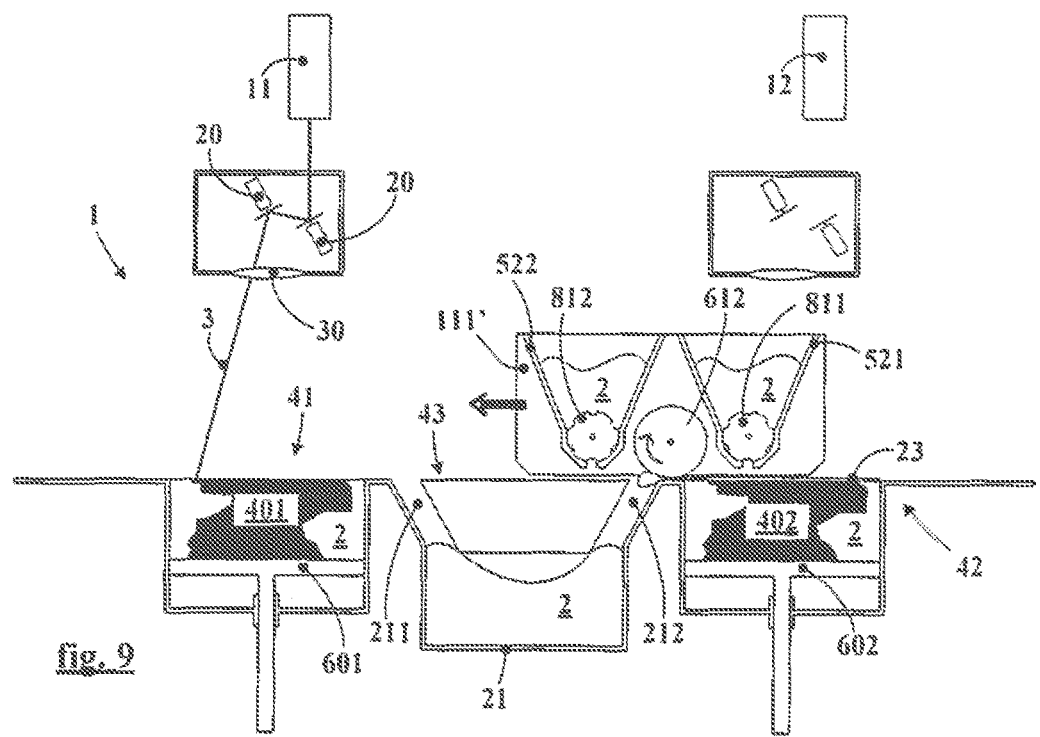

FIGS. 8 and 9 show a second preferred embodiment of the disclosure in which the layering device comprises two hoppers 521 and 522 and two rotary metering rolls 811 and 812 positioned on either side of a common distributing roll 612 within the movable carriage 111'. The left-hand hopper 522 and the left-hand metering roll 812 are used for layering the right-hand working zone 42 while the right-hand hopper 521 and the right-hand metering roll 811 are used for layering the left-hand working zone 41. The common distributing roll 612 is used for both working zones. If it is a counter-rotating roll, its direction of rotation is reversed for one of the working zones compared with the other. However, the movements of this layering device over the two working zones are similar to those described in FIGS. 2 to 7 for the first embodiment. Therefore, this manner of operating will not be illustrated again here.

Figure 10:
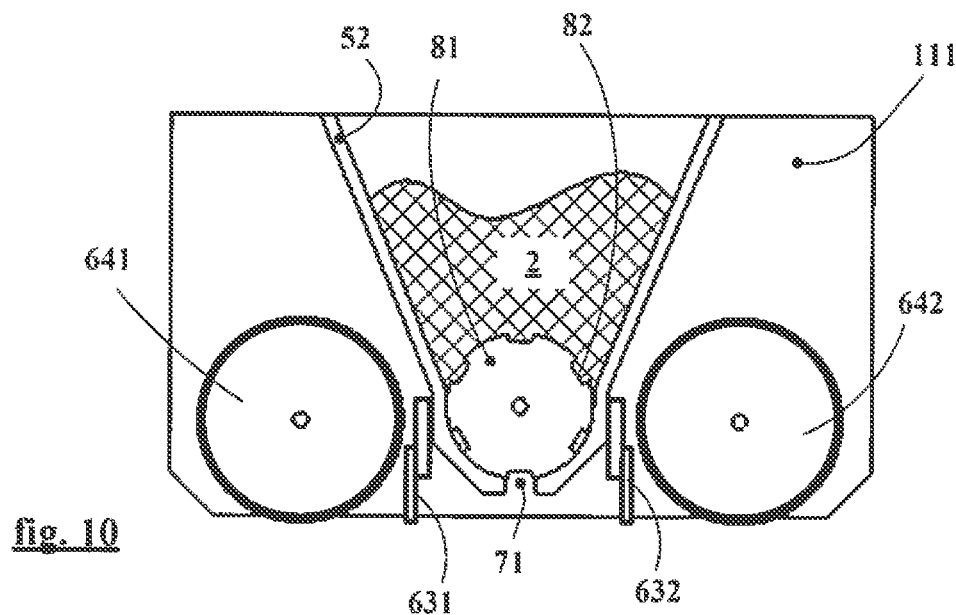
FIG. 10 is a schematic cross-sectional view of the layering device of a machine according to a third embodiment of the disclosure.

FIG. 10 illustrates a third embodiment of the disclosure, in which the distributing means use scrapers 631 and 632 that are likewise integral with the carriage 111. It will be understood that the left-hand scraper 631 is intended to distribute the powder over the left-hand working zone in a left-to-right movement of the carriage 111 and that the right-hand scraper 632 is intended to distribute the powder over the right-hand working zone in a right-to-left movement of the carriage 111. Preferably, fixed or counter-rotating compacting rolls 641 and 642 that are likewise carried by the carriage carry out additional compacting of the bed of powder. The left-hand roll 641 is used for the left-hand working zone and the right-hand roll 642 is used for the right-hand working zone. The rest of the machine and the operation of such a layering device are as described above with reference to FIGS. 3 to 7.

Figure 11:
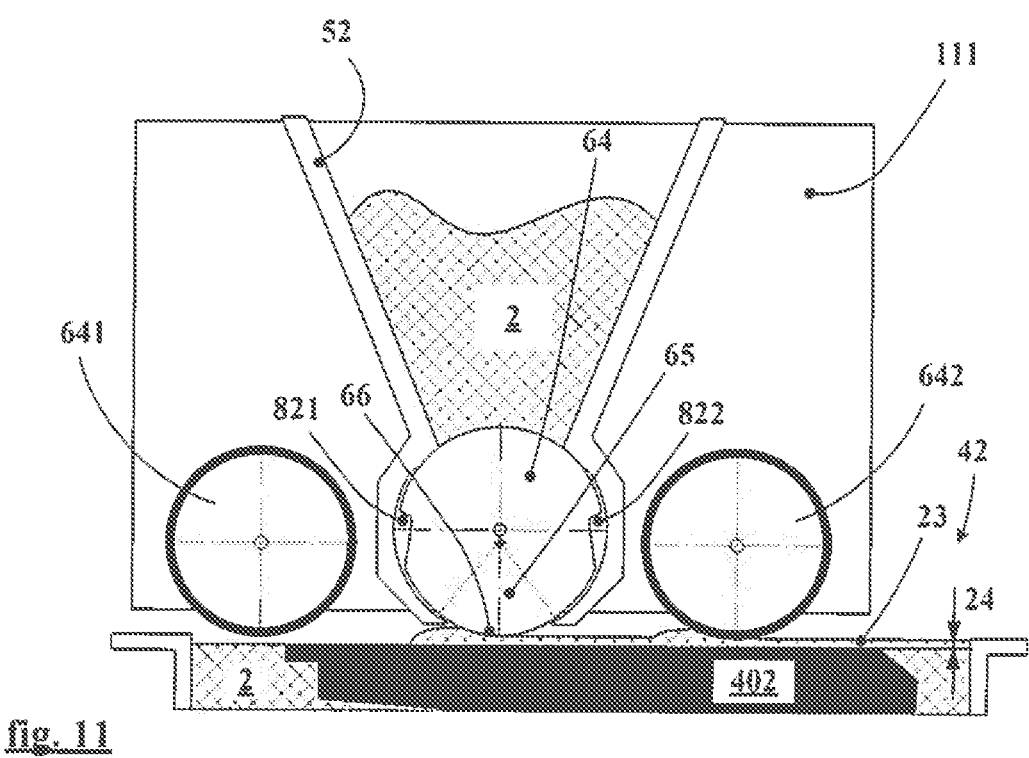
FIG. 11 is a schematic cross-sectional view of the layering device of a machine according to a fourth embodiment of the disclosure.

FIG. 11 shows a fourth embodiment of the disclosure, in which the metering means and the distributing means use a common rotary roll 64. The metering function is ensured by virtue of a groove 821 or 822 in the common roll 64 in accordance with the principle described above with reference to FIG. 3. The distributing function is ensured by a smoothing portion 65 of the common roll 64. Preferably, the common roll 64 is rotationally fixed during its movement over the working zone. The smoothing portion 65, that is to say that part of the common roll that is intended to distribute the powder, is symbolically delimited by dotted lines. Preferably, this portion has a bulge 66. This bulge, which has a small overall height (for example a few tenths of a millimetre at most) is scarcely perceptible in the figure, in spite of its magnification. The fact that the smoothing portion has a bulge 66 makes it possible to finely adjust the smoothing thickness by the choice of the angular position adopted by the common roll 64 during the operation of distributing the powder.

It will be understood that in the depiction of FIG. 1, the layering device is passing over the right-hand working zone 402, as described above, pushing the mass of powder 2 over the component 402 in order to smooth a layer of powder 23 with a final thickness 24.

Preferably, the layering device in FIG. 11 also comprises fixed or counter-rotating rolls 641 and 642 that are also carried by the carriage 11 and which carry out additional compacting of the bed of powder as described above for the embodiment in FIG. 10.

Typically, according to the disclosure, in the embodiments in which the distributing roll(s) are not counter-rotating rolls, each distributing roll is preferably mounted on an eccentric in order that its height with respect to the plane of the working zone is adjustable depending on the angular position of said roll. If need be, the same principle can also apply to the compacting rolls.

FIGS. 3 to 11 illustrate an essential feature of the disclosure, according to which the layering device makes it possible to carry out layering in a single passage, that is to say travelling once over the working zone, sweeping each of the two working zones from outside the working zone to the central waiting zone. This is true whether it is one working zone or the other.

It will be understood that a layer can thus be produced according to the disclosure in a single passage. It will also be understood that, in order to further improve the geometric quality of the layer of powder, it is also possible to carry out a second passage of the distributing means over the working zone (and thus a second passage of the carriage of the layering device) before subjecting the working zone to the energy beam.

Preferably, the quantity of powder stored in the hopper or hoppers is sufficient to produce hundreds, or even thousands, of layers, that is to say that the machine could achieve additive manufacturing of one or more complete component(s) without the hopper being refilled. Preferably, the hopper is refilled at a time when the layering device is not in operation. Refilling can be carried out for example when the manufacturing of the components has been finished and the finished components have been removed before a new manufacturing operation starts, but also during the melting phases (including simultaneous melting phases in both working zones).

The powder used is preferably a metallic or ceramic powder. Depending on the types of energy beams that are employed and depending on the intended thickness of the final layer, the mean diameter of the particles of the powder can vary from a few micrometres (for example 5 μm) to 300 or 400 μm.

The description of the machine and of the process according to the disclosure has been given on the basis of depictions of left-hand and right-hand parts of the machine that are entirely symmetrical. However, a person skilled in the art will understand that it is not necessary for the two parts of the machine to be completely identical. A person skilled in the art will also understand that the various embodiments described and illustrated here are specific examples of combinations of means according to the disclosure. Further combinations or obvious replacements of the various means with equivalent means, for example as described in application WO 2013/092757, are also part of the disclosure. For example, the principle of adding compacting rolls on either side of the distributing means, as described in the present FIGS. 10 and 11, can be applied to the embodiments in the preceding figures. Similarly, the principle of the disclosure of associating two working zones with a layering device common to these two working zones may be implemented with other types of layering device than those described in the present application, in particular with other types of layering device than those that are fed via the top.

The invention claimed is:

1. A Machine for additive manufacturing by sintering or melting powder using an energy beam acting on a powder layer in two working zones, the machine comprising a device for layering said powder, said device comprising:
   distributing means for distributing the powder that is able to travel over the two working zones in order to distribute the powder in a layer having a final thickness suitable for additive manufacturing,
   feeding means that is able to transfer the powder to the distributing means by gravity, metering means that are able to control the quantity of powder transferred to the distributing means,
   wherein the feeding means and the metering means are able to move with the distributing means,
   the two working zones are separate,
   the machine having two separate working trays that are able to move independently of one another,
   each of the two working trays is associated with only one of the two working zones, the device further comprises a movable carriage for carrying the feeding means, the metering means and the distributing means, said movable carriage being common to both working zones,
   the machine further comprises a central waiting zone situated between the two working zones, said central waiting zone being able to accommodate the movable carriage of the layering device,
   the layering device is configured in a substantially symmetrical manner so as to be able to travel over each working zone in the direction of the central waiting zone during a layering operation; and
   wherein the metering means comprise two rotary metering rolls positioned on either side of the distributing means, each of the two metering rolls being assigned to one of the two working zones.

2. The Machine according to claim 1, further comprising powder storage means, the powder storage means being positioned higher up than the working zones.

3. The Machine according to claim 1, comprising a source and means for controlling the energy beam, said source and means being inherent to each of the two working zones.

4. The Machine according to claim 1, wherein the layering device is configured to carry out the layering in a single passage over a working zone.

5. The Machine according to claim 2, wherein the storage means comprise at least one hopper, said at least one hopper also being carried by the movable carriage with the feeding means, the metering means and the distributing means.

6. The Machine according to claim 1, wherein the metering means comprise at least one rotary metering roll provided with at least one cavity.

7. The Machine to claim 1, wherein the distributing means comprise at least one distributing roll.

8. The Machine according to claim 7, wherein the height of said at least one distributing roll is adjustable depending on the angular position of said roll.

9. The Machine according to claim 1, wherein the distributing means use a single distributing roll that is common to both working zones.

10. The Machine according to claim 1, wherein the distributing means comprise two distributing rolls positioned on either side of the metering means and feeding means, each of the two distributing rolls being assigned to one of the two working zones.

11. The Machine according to claim 10, wherein the metering means use a single rotary metering roll that is common to both working zones.

12. The Machine according to claims 1, wherein the distributing means comprise two scrapers positioned on either side of the feeding means, each of the two scrapers being assigned to one of the two working zones.

13. The Machine according to claim 1, also comprising two compacting rolls, the movement of which over the working zone is as one with the movement of the distributing means, each of the two compacting rolls being assigned to one of the two working zones.

14. The Machine according to claim 6, wherein the at least one cavity comprises a groove capable of defining a metered quantity of powder during metering.

* * * * *